United States Patent [19]

Moreau

[11] 4,251,836

[45] Feb. 17, 1981

[54] SYSTEM FOR BROADCASTING FACSIMILE SIGNALS

[75] Inventor: Jean Moreau, Janze, France

[73] Assignee: Etablissement Public de Diffusion dit "Telediffusion de France", Montrouge, France

[21] Appl. No.: 911,349

[22] Filed: Jun. 1, 1978

[30] Foreign Application Priority Data

Jun. 7, 1977 [FR] France .................................. 77 18106

[51] Int. Cl.³ .......................... H04M 1/36; H04M 1/32
[52] U.S. Cl. ..................................... 358/264; 358/257
[58] Field of Search ............... 358/257, 264, 256, 148, 358/147, 267

[56] References Cited

U.S. PATENT DOCUMENTS

| | | | |
|---|---|---|---|
| 3,491,199 | 1/1970 | Weinstein et al. | 358/147 |
| 3,622,703 | 11/1971 | Ricketts, Jr. et al. | 358/267 |
| 3,958,088 | 5/1976 | Vieri | 358/257 |
| 4,058,672 | 11/1977 | Crager et al. | 358/257 |
| 4,058,830 | 11/1977 | Guinet et al. | 358/86 |
| 4,115,662 | 9/1978 | Guinet et al. | 358/86 |

FOREIGN PATENT DOCUMENTS 905509  9/1962  United Kingdom ..................... 358/264
1208479 10/1970 United Kingdom ..................... 358/264

OTHER PUBLICATIONS

Y. Chauvel, "Facsimile in Tomorrow's Organization," 9-20-78-CCETT.

Primary Examiner—Robert L. Griffin
Assistant Examiner—Edward L. Coles
Attorney, Agent, or Firm—Laff, Whitesel & Rockman

[57] ABSTRACT

A system for broadcasting data makes it possible to broadcast facsimile data toward a plurality of telecopying apparatuses, using an asynchronous broadcasting network.

To each telecopying device there is joined a reception juncture device which develops a going time base or clocking to synchronize the telecopying device. At the emitting station, an emission juncture device simulates the operation of a reception juncture device to govern the transmission of the signal by the network.

7 Claims, 4 Drawing Figures

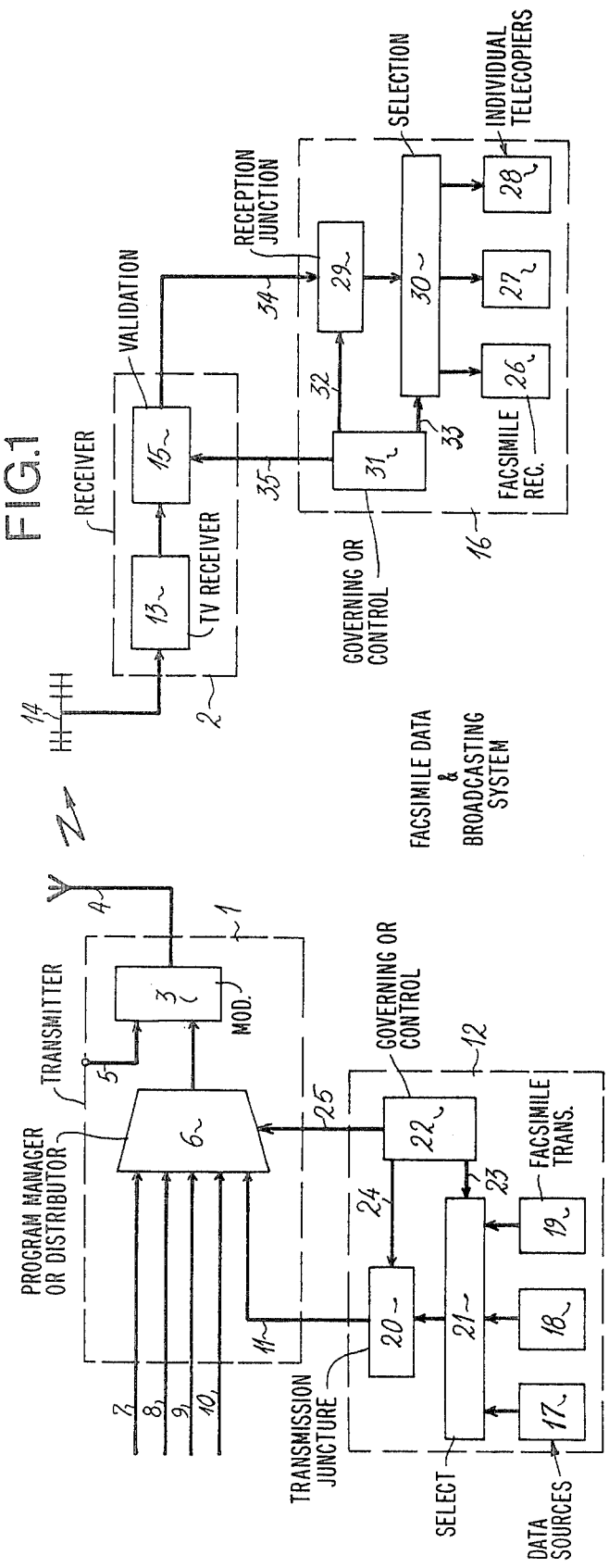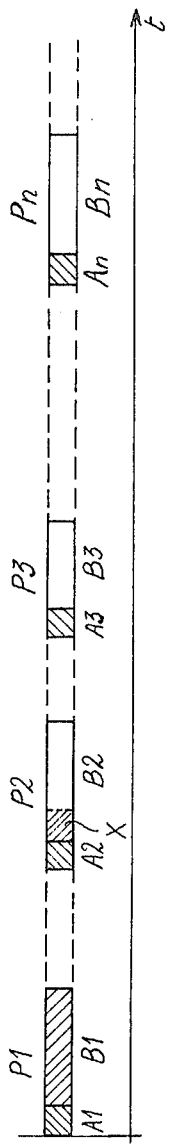

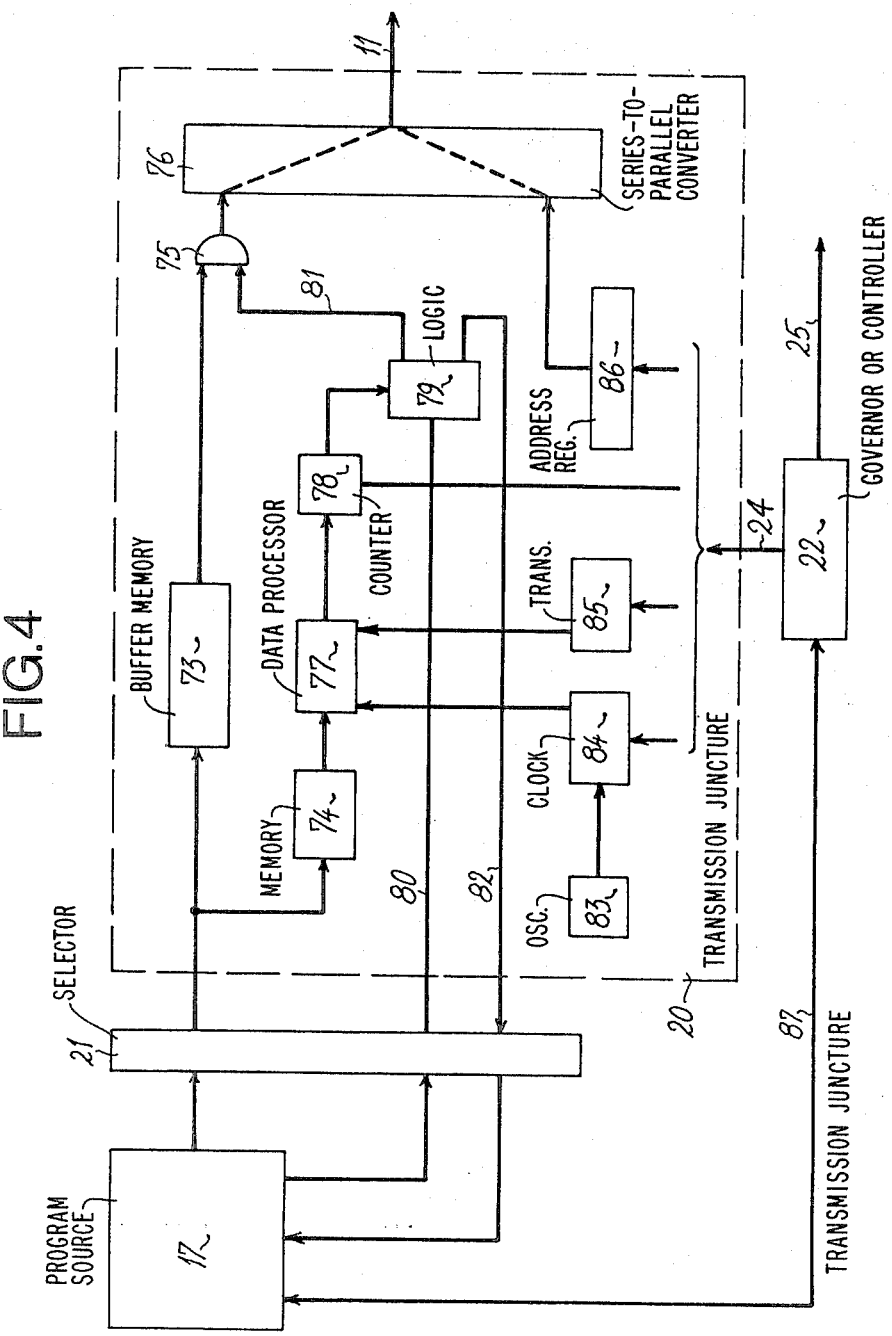

SYSTEM FOR BROADCASTING FACSIMILE SIGNALS

The present invention relates to a broadcasting systems system and, especially, to a system which makes it possible to broadcast images or written documents toward several facsimile receiving sets which are also called "telecopying devices."

The terms "going" or "transmitting" time base refer herein to the facsimile signal transmission from a broadcasting station. The terms "return" or "receiving" time base refer herein to the utilization of the facsimile signals in a receiver. The invention is especially concerned with synchronization of the transmitting and receiving time bases.

In the present technique, the facsimile transmission apparatuses, that is to say the telephotography or the telecopy apparatuses, are essentially conceived for the purpose of transmitting, at a given point in time, a message addressed to a single addressee. When it is desired, with those apparatuses, to accommodate a large number of users, the present techniques must provide for specialized transmission networks or for complex transmission procedures which appreciably limit the use of that type of service such a limitation does not make it very attractive for either the general public or for institutions such as broadcasting networks.

In French Patent Application No. 75 18319, filed on June 6, 1975 (now U.S. Pat. Nos. 4,058,830 and 4,115,662) in the joined names of l'Establissement Public called "Telediffusion de France" and of the French State, has a title "A systeme for the diffusion of data" There, a data broadcasting system is described in which an emitting station diffuses, in the form of packs or sets of pack or numerical data coming from several paths, each pack or set comprising a prefix which contains, in particular, a path identification code making it possible for the user to receive the data coming from a path in a receiving set which feeds an apparatus capable of processing the received data. The transmission support making diffusion possible is, preferably, a television broadcasting network. This makes it possible to reach a large number of possible users through the use of an existing infrastructure or, in any case, of a very well known one, that is the infrastructure of the television networks.

In each set of data, after the prefix, there is a zone of data which, in the 625 line television standard, can comprise at most 32 octets. The rate of delivery of the diffused data is variable. It may reach very high rhythms, as high as $4.10^6$ bits, for example. The diffusion system is completely transparent to the useful data to be transmitted. The line frequency of television signals, which enjoys a good stability, makes it possible to obtain especially stable clock signal references. However, it is necessary to mention that such a diffusion system is a unidirectional one. That is to say, it prevents the dialogue procedures between the source of data and the receiving set. It must be well understood that the broadcasting of the sets of signals through the system is asynchronous. The interface circuits between the source and the system for one part, and the receiving equipment and the data treatment apparatus for the other part, also have asynchronous operations. Those interface circuits are, for example, of the type of the one described in French Patent Application No. 74 13136, filed on Apr. 16, 1974 and the title of which is "Stadardized interface device for telecommunications" (now French Pat. No. 2,268,308).

One object of the present invention consists in providing for a facsimile data broadcasting system, toward several telecopying apparatuses, using as a broadcasting support a completely asynchronous system, such as the one described in patent application No. 75 18319, (U.S. Pat. Nos. 4,058,830 and 4,115,662) already mentioned.

It is well known that a facsimile telegraphy or telecopy apparatus, such as a so-called Group I apparatus, according to the CCITT recommendations, is characterized by a perfectly synchronous apparatus which results from the mode of exploration chosen for the analysis and the reproduction of the document to be transmitted. That is to say, there is a helix-shaped sweep on a cylinder rotating at a constant speed. Moreover, such an apparatus comprises special circuits which make it possible to ensure a correct freezing of the restricted signals, respective to the reconstituted support, so that the restituted document will not be cut in half by the dead zone of the analysis cylinder which generally serves for the fixation of the analyzed document.

One object of the invention includes providing for a system comprising means for respecting the synchronism of the telecopy apparatus, even though the signals to be treated are transmitted by an asynchronous and unidirectional transmission system.

According to a characteristic of the invention, there is provided a system having the reception juncture device. There is generated a transmit, forward, or going time base from a line point counter governed by a point clock signal, which itself is governed by the receiving or return time base delivered by the telecopying device which, in the conventional manner, uses the going time base to synchronize its operation and the return time base. The line point counter is started by a signal transmitted by the broadcasting system. According to another characteristic, there is provided a system using the emission juncture device. A fictitious going time base is generated, from a highly stable oscillator which is used in a pseudo reception juncture device to treat the data emitted by the source as in the reception junction device, but with an advance time.

According to another characteristic, there is provided, in the reception juncture device, a buffer memory for retrieved data at the clock rate or rhythm of the binary elements, the rate or rhythm being governed from the return time base.

According to another characteristic, there is provided, in the emission juncture device, a buffer memory which is filled with the data coming from the source, and from which the data are transmitted to the broadcasting system in sets, so as not to let the buffer memory of the reception juncture device become completely empty, i.e. not to let it overflow.

The above-mentioned characteristics of the present invention, as well as others, will appear more clearly upon a reading of the following description of one example the description being given relative to the attached drawing, in which:

FIG. 1 is a block-diagram of a facsimile data broadcasting system, according to the invention.

FIG. 2 is a diagram which shows sets of data transmitted by the system according to the present invention.

FIG. 4 is a block-diagram, more detailed, of an emission juncture device used in the system in FIG. 1.

Figure 3:
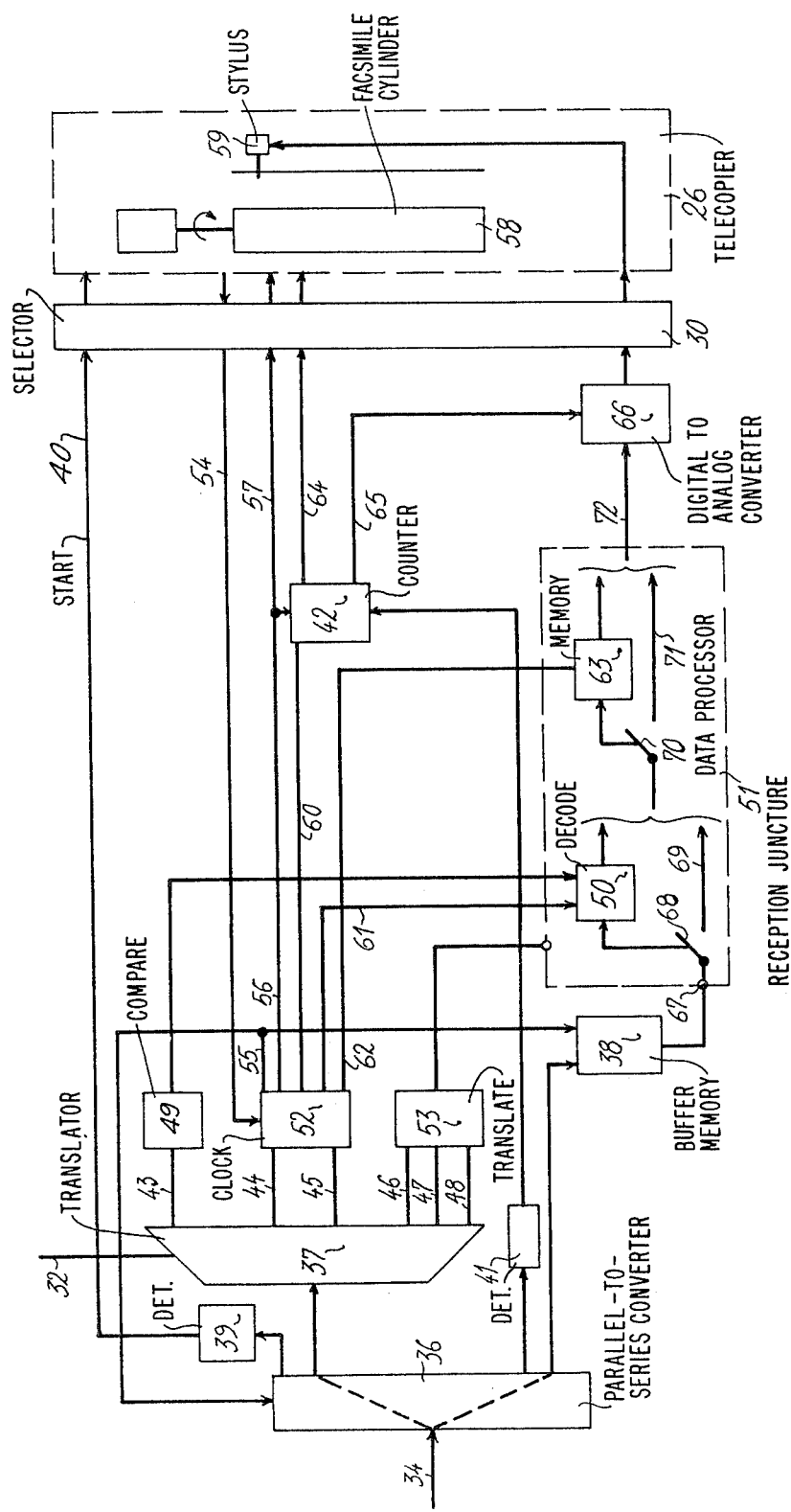
FIG. 3 is block-diagram, in more details, of a reception juncture device used in the system in FIG. 1.

In FIG. 1, there has been represented a station 1. for the transmission of sets of data, according to the teachings of a system described in French Patent Application No. 75 18319, (now U.S. Pat. Nos. 4,058,830 and 4,115,662 already mentioned, as well as a reception element 2 of the same system. Station 1, comprises a modulation equipment 3 which feeds, through an transmitter, not represented, a broadcast antenna 4, and which is capable of transmitting either television images sent by connection 5 or sets of data sent by a "manager" or program distribution 6. "Manager" 6 the block-diagram of which can be found in FIG. 3 of patent application No. 75 18319 (now U.S. Pat. Nos. 4,058,830 and 4,115,662), performs the multiplexing over time of blocks of data supplied by way of paths 7 to 11. Among paths 7 to 10, there may be a path supplying date data, or teletex data used, for example, in the system described in French Patent Application No. 76 27212, filed on Sept. 6, 1976 (U.S. patent application Ser. No. 830,165, filed Sept. 2, 1977, now abandoned in favor of its 37 CFR 1.60 continuation Ser. No. 39,837, filed May 17, 1979). Path 11 supplies data coming from a circuit 12 for the transmission of facsimile signals according to the present invention.

The receiving equipment 2 comprises a television receiver 13 which receives the HF signals from a reception antenna 14, and which delivers video signals to a validation circuit 15 which supplies the facsimile data to a reception circuit 16.

The transmission circuit 12 comprises several sources of numerical facsimile data 17 to 19, which can be selectively connected to a transmission juncture device 20, through a selection circuit 21, under control of a governing or control circuit 22. Of course it may include more than three sources, as in the described example. Circuit 21 is controlled by way of connection 23 from the control circuit 22, and is a circuit suitable for transmissions of numerical data. A connection 24 between circuit 22 and the transmission juncture device 20 makes it possible to fit the operation of juncture device 20 to the type of the source 17, 18 or 20.

Path 11 is a junction of the type described in French Pat. No. 74 13136, already mentioned. Between governing or control circuit 22 and the "manager" or program 6, there is a connection 25 which transmits to "manager" or distribution 6 an information relative to the operation of the transmission simulating device of the "manager". This information depends on the speed of operation of the telecopying devices which may receive the data coming from sources 17, 18 or 19 selected by control circuit 22. The operation of the transmission simulating device of "manager" or distributor 6 has been described in detail in connection with unit 49 of U.S. Pat. No. 4,115,662, and it will not be repeated here. It will only be recalled that, the data transmission is unidirectional. A situation must be avoided in which the sets are diffused at a rhythm or rate which is too rapid to permit their being treated in the data receivers. That is why the simulating device simulates the emptyings of the buffer memory or "manager" or distributor 6 toward the broadcasting antenna 4.

A counter counts the number of simulated emptyings between two real emptyings. When a predetermined count has been reached, the buffer memory of the "manager" is emptied, even though it might not then be full.

The operation of the facsimile transmitter circuit 12 is as follows. With the help of the governing or control circuit 22, fitted with a desk, not represented, the operator of circuit 12 selects the source of facsimile numerical data which are to be transmitted. This causes the connection between the output of the source and juncture device 20, to be selected through circuit 21. The sending of governing signals toward juncture device 20, is via wire 24, and the sending of the speed information to the manager or distributor circuit 6, through wires 25. There will be later seen in detail the operation of juncture device 20, relative to FIG. 4. For the time being, it is sufficient to know that juncture device 20 transmits, through wires 11, to "manager" or distributor circuit 6, blocks or sets of data which are temporarily stored in the buffer memory of manager or distributor 6 and to which "manager" 6 adds a prefix to form true blocks or sets to be transmitted at a determined point in time determined by "manager" 6.

There has been represented, in FIG. 2, a series of those blocks or sets of data, from set P1 carrying the beginning of a message transmitted by a source to the usual set Pn, etc. Each set Pn comprises a prefix An and a block or set of data Bn. Prefix An is composed, in the example being described, of eight octets of binary elements. The first three octets are reserved for the synchronization of the bit rate and of the octets, the next three for the identification of path 11, the seventh one to give the index n of the set, and the eighth one to indicate the size of the set. It appears, therefore, that two prefixes of necessity differ by their index octets, and obviously by their size octets. Thus set P3, shorter than the other sets shown, will have a size octet indicating a figure lower than 32.

Block B1 and the X-part of block B2 have been shaded to indicate that the data they contain have an object which is different from those contained in the following blocks. In practice, the data of the shaded zones constitute the address of the message. They serve, in the reception juncture device of the telecopying device, to identify the source of data (17–19) selected by controller 22 in the transmission circuit, and to deduce from it the governing signals, as will be seen below.

Reception circuit 16 comprises several receiving sets, or telecopying devices 26 to 28, which can be selectively connected to a reception juncture device 29, through a selection circuit 30, under control of a governing circuit 31. It has been assumed that it comprises as many receiving sets as there are sources, but it may of course comprise fewer of them. Circuit 30 is similar to circuit 21. A connection 32 extends between circuit 31 and juncture device 29 and makes it possible to indicate to juncture device 29 the identity of the transmission source which it is to receive. A connection 33 extends between circuit 31 and 30 and makes it possible to select the apparatus to receive the signals from that source, with which it must be compatible. The input of juncture device 29 is connected, at the output of validation circuit 15, by a junction 34 of the same type as junction 11, to the transmission channel. Finally, a connection 35 between governing circuit 31 and validation circuit 15 transmits the code of the path to be received.

The structure and the operation of validation circuit 15, is shown in FIG. 6 in the U.S. Pat. No. 4,115,662, and are entirely described in that patent. With respect to an adaptation to circuit 16 of the present application, it may be considered that connection 35 transmits to circuit 15 the information usually recorded on a magnetic validation ticket The reception juncture device 29 is shown, in more detail, in FIG. 3, where it is assumed to be connected to telecopying device 26, through selector 30. In reception junction 29, connection 34 ends at a parallel-series converter 36 which receives the parallel data octets and retransmits then in series, switching them, with respect to the octets of the address, defined FIG. 2 by B1+X, toward the input of a translator 37. With respect to the facsimile data octets, properly speaking, switching is toward the input of a buffer memory 38. Moreover, a detector 39 connected to a corresponding output of converter 36, detects the arrival of the first octet transmitted via wires 34, and sends a starting signal to the starting input 40 of telecopying device 26. A detector 41, connected to a corresponding output 36, detects the switching in direction from translator 37 toward memory 38, and transmits a start of operation signal to the starting of operation input of a counter 42.

Translator 37 further comprises a governing signal input, connected to connection 32. Output 43 of translator 37 is connected to the input of a comparison circuit 49 which compares the terminal type information coming from connection 32 with the corresponding data of the address received, to deliver a validation signal and, possibly, decoding data to a decoding device 50 contained in a data processing circuit 51. Output 44 transmits to a clock generator 52 the data indicating the number of points per line, while output 45 transmits to clock 52 the data (datum) of the number of lines per millimeter. Outputs 46, 47 and 48 respectively transmit to a translation circuit 53 the data indicating that the reproduction is to take place, either in black and white, or with several levels of grey, indicating the number of those grey levels, and whether the points of the to be received data are coded or not. Translation circuit 53 applies, as a function of the data, governing orders to data processing circuit 51.

Clock signal generator 52 receives, through connection 54, either the internal time base signal of the telecopying device 26, or the return time base signal. It is well known that telecopying devices develop, from the speed of rotation of their cylinder, an internal time base signal which, normally, is compared with a going time base signal accompanying the facsimile signals. Each telecopying device comprises the necessary phase locking circuits to perform the setting-into-phase of the two time base signals. Clock pulse 52 comprises a divider with a division ratio which is adjustable through the signals received from inputs 44 and 45, and delivers, especially over conductor 55, a clock signal of the binary elements which signal is applied to converter 36 and to buffer memory 38. On conductor 56, a signal is is transmitted through conductor 57 to governing or control circuits of the telecopying device 26, which are provided to obtain the value of the speed of the cylinder 58 and that of the speed of displacement of the carriage of stylus 59, those speeds obviously being dependent on the number of points per line and on the number of lines per millimeter which have been chosen for reproduction. Conductor 60, a point clock signal is applied to the counting input of counter 42. By conductor 61, a clock signal is sent toward decoding device 50 of data processor 51. Finally by conductor 62, a clock signal is sent toward a small capacity memory 63 provided in data processor 51.

Counter 42 counts the impulses transmitted to it by way of conductor 60. When it has reached a first pre-determined count, which corresponds to the number of points in one line and which may be derived for one part from the information transmitted by way of conductor 57, it delivers, through wire 64, a signal which constitutes the going time base, toward the conventional time base locking circuit of telecopying device 26. Counter 42 also counts the number of signal it delivers through conductors 64 and as long as that count has not reached a second pre-determined count, it delivers, through wire 65, to a digital-to-analog converter 66 a 'forbidding-to-write' signal. Then, when the second count has been reached, it delivers between the going time base signal and a time which is determined by a third count of the number of predetermined points, still on wire 65 toward converter 66, a bar-removal signal.

In practice, the impulses delivered on conductor 60 have the frequency of the points of telecopying device 26. In counter 42, the first count is equal to the number of points in one line. The second count corresponds to a temporizing count or to a number of rotations, 15 for example, performed by cylinder 58 of the telecopying device from the time when it starts its operation, during which time the cylinder develops its constant speed after locking its internal time base onto the going time base transmitted by way of conductors 64. Therefore, until the end of the time base adjustments, counter 42 sends to converter 66, through conductors 65, a signal which forbids writing, and the telecopier carriage and stylus 59 does not move. After the time base adjustments, during the time defined by the third count, and which follows that sent via conductors 64, the signal transmitted on conductors 65 forces converter 66 to deliver, toward telecopier 26, a signal having a predetermined potential for 'Blanking'; after the third count, at the end of the signal on conductors 65, converter 66 comes back to its normal state. Converter 66 transmits its analogic output signals to the head of stylus 59, in a conventional manner.

The parallel-series converter 36 normally orients any start of a message received from conductors 34 toward translator 37. It comprises means for the detection of the first octet that is received, which starts the detector 39 which, then, transmits the starting signal via wire 40 to telecopying device 26. It is well known that between the time of the start and the time at which the telecopying device has reached, with respect to its cylinder 58, its cruising speed, there exists a certain delay (time laps), equivalent to approximately 15 rotations of the cylinder, for example.

Data processing circuit 51 has its input 67 connected to the output of buffer memory 38. In data processor 51, depending on the position of switch 68, the output is connected either to a wire 69 or to the input of decoding device 50. Wire 69 and the output wire of decoding device 50 are connected in parallel, depending on the position of a switch 70, either to wire 71, or to the input of small capacity memory 63. Wire 71 and output of memory 63 are connected to the corresponding inputs of digital-to-analog converter 66, through connection 72. Assume first of all that the facsimile data are in black and white. Simply, this means that each binary element coming out of memory 38 must be translated, depending on its value 0 or 1, by the writing of a black or of a white dot (or vice-versa). Each binary element corresponds to one point of each line. In the address, the datum information of that mode is translated by circuit 37 which delivers a signal on conductor 46, but nothing on conductor 47 and 48, so that 53 gives an order which sets switches 68 and 70 to work. Therefore, input 67 is directly connected to conductor 72 through conductors 69 and 71. It must be well understood that the switches, symbolically represented by contacts 68, 70, preferably operate electronically.

Assume now that the facsimile data are in black and white and coded. This means that each binary element no longer corresponds to one point of a line, but that the binary elements, grouped into coded motives, may represent a more or less important number of black or white points, or even a more or less long black or white band space. In that case, conductors 46 and 48 transmit signals to translator 53 which leaves contacts 68 at rest and operates contacts 70. Decoding device 50 receives the groups of bits or motives from memory 38 and decodes them while transmitting them toward switch 70 and conductors 71, at its output, binary elements each one of which now corresponds to one point of a line. The rate of flow of the binary elements on conductor 71 now is without relation to the rate of flow of the binary elements of groups of bits or motives delivered by buffer memory 38, which depends on the time of data processing in decoder 50 and, consequently, it is without any relation to the rate of flow of the binary elements which enter memory 38. That is to say, without relation with respect to the rate of flow of the octets of data applied to converter 36, therefore with the rate of flow of the sets or pacts of data. The conditions of good functioning are the capacity of memory 38 to deliver the bits of a motive when coding device 50 has completed the treatment of the preceding motive, and that the bits transmitted to memory 38 by way of conductor 34 will not make the memory overflow.

Assuming now that the data are in a multiple level mode, but not coded, this means that, for example, for a 4 level mode, to a two binary element motive there corresponds one point of line to be reproduced. Conductor 47 sends a signal to translator 53 which operates contacts 68 but leaves contacts 70 at rest. Memory 63 receives the group or motives of 2 bits, and it transmits, on its output wire bundle, information to converter 66, through conductors 72, at the rhythm or rate of the points of telecopier 26. Here, therefore, the rate of flow of the bits delivered by buffer memory 38 must be double the rhythm or rate of the points.

If it is assumed that the facsimile data are in a mode with multiple levels, coded, it is necessary to combine the above-described modes of operation. Conductors 47 and 48 send signals to translator 53 which leaves contacts 68 and 70 at rest. The reading rhythm or rate of the bits in memory 38 is without relation to the frequency of the points. The above-mentioned conditions, however, must still be respected.

It must be further noted that converter 36 comprises means for the detection of the end of the address of the message, to start detecting device 41 which, in its turn, causes the start of the beginning of the counting in counter 42. It is that point in time which makes possible the setting-in-phase of the counter and therefore, as a consequence, of the time base of the telecopying device 26, with the message of the facsimile data.

There will now be described the transmission juncture device 20 (FIGS. 1 and 4) which is connected to source 17 through selector 21. The connection of the data output of source 17 is connected, in parallel, to a buffer memory 73 and to a memory 74. The output of memory 73 is connected to the first input of a gate 75 the output of which is connected to the facsimile data input of a series-parallel converter 76 the output of which is connected to an output connection 11. The output of memory 74 is connected to the input of a data processor circuit 77, similar to circuit 51 in FIG. 3, the output of which, equivalent to 72, is connected to a counter 78 which counts the point informations sent by processor 77. Counter 78 is a cyclic counter, the capacity of which is regulated by information coming from governor or controller 22, through conductor 24. Its count indicates, at each moment, to which point the data being processed in processor 77 corresponds. Its count output is connected to the input of a logical circuit 79 which is programmed so that, as a function of the count of counter 78 and of information supplied by program source 17, through conductor 80, it will either open or close gate 75, through conductor 81, in order to enable or to prevent converter 76 reading of buffer memory 73.

Thus, with the help of data processor 77, the operation of the reception juncture device 29 is simulated, thus making it possible for logical circuit 79 to cause converter 76 to transmit the data with a sufficient advance over time for memory 38 not to be empty, but an advance not too great in order to prevent memory overflow. Moreover, data processing circuit 77 sends in due time, through conductor 82, requests for the reading of data.

To cause the operation of data processing juncture device 20 contains oscillator 83, for giving a time base, which plays the part of the time base delivered by source 26 (FIG. 1) into receive junction 29. Oscillator 83 may be a highly stable oscillator, for example, governed by a quartz clock circuit 84, similar to clock 52 (FIG. 3), and a translator 85, similar to translator 53. Circuit 84 supplies the clock pulses necessary to data processor 77 and to converter 76, as well as, possibly, to other circuits. Circuit 85 governs the switchings necessary in data processor 77. Circuits 84 and 85 are regulated by suitable governing informations supplied by control circuit 22 (FIG. 1).

Finally, juncture device 20 comprises also an address register 86 the output of which is connected to the address input of converter 76 and which contains the address message which precedes the facsimile data. The content of address register 86 obviously is determined by the governing circuit 22. The switching control of the inputs of converter 76 may be done by internal means. Governing or control circuit 22 is, preferably, connected to source 17 by a service connection 87.

It must be well understood that there have been represented, in the example described, several separate sources, but that it is possible to have a single source capable of delivering the same informations, or different informations according to several modes, successively to each transmission juncture device. Depending on the mode, the governing or control circuit adapts the circuits of the juncture device, this making it possible to broadcast in succession informations toward telecopying devices of different types.

I claim:

1. A system for the asynchronous broadcasting of facsimile data toward a plurality of telecopying reproduction means, the operational movement of a scanning head over a reproduced copy in said telecopying reproduction means being continuously synchronous, means in said telecopying reproduction means for developing a receiving time base responsive to the operation of said telecopier reproduction means, means for phase-locking system circuits in order to set into phase the coordination of said receiving time base developed responsive to operation of said telecopier reproduction means and a transmitting time base associated with said broadcast data, said system comprising a facsimile data receiver which contains a line point counter means governed by a clock signal coordinated with said receiving time base, said line point counter means being set into operation by a predetermined signal received with the facsimile data, said predetermined signal delivering the transmitting time base.

2. A broadcasting system according to claim 1 characterized in that the telecopying reproduction means have a helical sweep over a cylinder rotating at constant speed, and in that the receiving time base is developed responsive to rotation of the cylinder.

3. A broadcasting system according to any one of the claims 1 or 2, and reception juncture means having a buffer memory means from which data is retrieved at a binary clock rate of said system, said binary rate being governed by the receiving time base.

4. A broadcasting system according to claim 1 or 2, and highly stable oscillator means, transmission juncture means responsive to information transmission for developing a fictitious transmitting time base from the output of said highly stable oscillator means, which is used in a pseudo receiver juncture means, to process data sent from a program source as said data are in the reception juncture means, with some advance in time framing.

5. A broadcasting system according to claim 4, characterized in that said transmission juncture means includes a buffer memory means which is filled with the data coming from the source, and the data of which are transmitted through the broadcasting system in sets so that the buffer memory of the reception juncture means does not become either completely empty or overflowing.

6. A system for asynchronously broadcasting facsimile data toward a plurality of telecopying reproduction means, the facsimile data being relative to a page and being composed of a message address followed by image point data, said data being transmitted in an asynchronous manner, said telecopying reproduction means continuously operating in a synchronous manner, means in said telecopying reproduction means for phase-locking system circuits in order to set into phase the coordination of said receiving time base developed responsive to operation of said telecopier reproduction means and a transmitting time base associated with said broadcast data, said system comprising a facsimile data receiver which contains a line point counter means governed by a clock signal coordinated with said receiving time base, said line point counter means being set into operation by a predetermined signal received with the facsimile data, said predetermined signal delivering the transmitting time base, decoder means, the receiver comprising a switching circuit means which sends the data of the address into said decoder means and the image data into the buffer memory, a first reception detector means for detecting the beginning of the address and starting an operation of a motor and a rotating cylinder of said telecopier reproduction means, a second reception detector means for detecting the end of the address, divider means, the data of the address indicating the number of points per line and the number of lines per millimeter being decoded in the decoding means to be applied to the governing inputs of said divider means to select its division ratio, the signal input of said divider means receiving said receiving time base and the outputs of said divider means for delivering the frequency signal of the points which is applied to a counter means, the output of which delivers the transmitting time base to said phase-locking means, when said counter has been started responsive to the output signal of the second detector means.

7. A broadcasting system according to claim 6 characterized in that the telecopying reproduction means have a helical sweep over a cylinder rotating at constant speed, and in that the receiving time base is developed responsive to rotation of the cylinder.

* * * * *

UNITED STATES PATENT AND TRADEMARK OFFICE
CERTIFICATE OF CORRECTION

PATENT NO. : 4,251,836
DATED : February 17, 1981
INVENTOR(S) : JEAN MOREAU

It is certified that error appears in the above—identified patent and that said Letters Patent is hereby corrected as shown below:

Col. 1, Line 2,
delete "systems".

Col. 1, Line 26,
after "service" insert --.--; "such" should be --Such--;

Col. 1, Line 33,
after "data" insert --.--;

Col. 2, Line 19,
"reconstituted" should be --reconstitution--;

Col. 2, Line 20,
"restituted" should be --reconstituted--;

Col. 3, Line 1,
after "1" (second occurrence) delete ".";

Col. 3, Line 11,
"distribution" should be --distributor--;

Col. 3, Line 44,
after "program" insert --distributor--;

UNITED STATES PATENT AND TRADEMARK OFFICE
CERTIFICATE OF CORRECTION

PATENT NO. : 4,251,836
DATED : February 17, 1981
INVENTOR(S) : JEAN MOREAU

It is certified that error appears in the above—identified patent and that said Letters Patent is hereby corrected as shown below:

Col. 3, Line 46,
"distribution" should be --distributor--;

Col. 5, Line 52,
delete "is" (second occurrence);

Col. 5, Line 60,
change "Conductor" to --On conductor--;

Col. 6, Line 67,
after "that" insert --translator--;

Col. 8, Line 27,
after "processing" insert --circuit 77,--.

Signed and Sealed this

Seventh Day of July 1981

[SEAL]

Attest:

RENE D. TEGTMEYER

Attesting Officer    Acting Commissioner of Patents and Trademarks